(12) United States Patent
Jain et al.

(10) Patent No.: US 8,958,408 B1
(45) Date of Patent: *Feb. 17, 2015

(54) CODED APERTURE SCANNING

(75) Inventors: Atul Jain, Cerritos, CA (US); David A. Whelan, Newport Coast, CA (US)

(73) Assignee: The Boeing Company, Chicago, IL (US)

( * ) Notice: Subject to any disclaimer, the term of this patent is extended or adjusted under 35 U.S.C. 154(b) by 342 days.

This patent is subject to a terminal disclaimer.

(21) Appl. No.: 13/445,064

(22) Filed: Apr. 12, 2012

Related U.S. Application Data

(63) Continuation-in-part of application No. 12/133,959, filed on Jun. 5, 2008.

(51) Int. Cl.
*H04B 7/216* (2006.01)
*H04B 7/06* (2006.01)
*H04L 1/00* (2006.01)

(52) U.S. Cl.
CPC ............ *H04B 7/0678* (2013.01); *H04L 1/0059* (2013.01)
USPC ........... 370/342; 370/334; 375/267; 375/295; 375/299; 342/368

(58) Field of Classification Search
None
See application file for complete search history.

(56) References Cited

U.S. PATENT DOCUMENTS

| | | | |
|---|---|---|---|
| 4,974,187 A | | 11/1990 | Lawton |
| 5,115,243 A | * | 5/1992 | Perry et al. ................. 342/158 |
| 5,151,921 A | | 9/1992 | Hashimoto |
| 5,276,455 A | | 1/1994 | Fitzsimmons et al. |
| 5,793,798 A | | 8/1998 | Rudish et al. |
| 5,802,266 A | * | 9/1998 | Kanekawa et al. ............. 714/11 |
| 5,961,463 A | | 10/1999 | Rhyne et al. |
| 6,084,545 A | * | 7/2000 | Lier et al. ..................... 342/360 |
| 6,351,499 B1 | | 2/2002 | Paulraj et al. |
| 6,375,618 B1 | | 4/2002 | Chiao et al. |
| 6,411,256 B1 | * | 6/2002 | Lier et al. ..................... 342/375 |
| 6,487,433 B2 | | 11/2002 | Chiao |
| 6,665,825 B1 | | 12/2003 | Mobin et al. |
| 6,785,520 B2 | * | 8/2004 | Sugar et al. .................. 455/101 |
| 7,151,476 B2 | * | 12/2006 | Egri et al. .................. 342/25 R |
| 7,352,688 B1 | * | 4/2008 | Perahia et al. ................ 370/206 |
| 7,546,467 B2 | | 6/2009 | Lemma et al. |

(Continued)

FOREIGN PATENT DOCUMENTS

| | | |
|---|---|---|
| EP | 1918734 A1 | 5/2008 |
| EP | 2131508 A3 | 3/2010 |

OTHER PUBLICATIONS

Passive phased arrays for radar antennas, EMS Technologies, Inc., Dec. 2005, retrieved from the Internet at http://www.emsdss.com/pdf/PassivePhasedArraysApNote.pdf.

(Continued)

*Primary Examiner* — Ian N Moore
*Assistant Examiner* — Dung B Huynh
(74) *Attorney, Agent, or Firm* — Toler Law Group, PC

(57) ABSTRACT

A particular method includes splitting a signal into multiple portions corresponding to elements of an array. The method also includes coding and phase adjusting the multiple portions of the signal to form phase adjusted, coded portions of the signal by coding each portion of the multiple portions with a different code and by applying phase adjustments associated with the corresponding elements of the array to the portions. The method also includes transmitting the phase adjusted, coded portions of the signal via the corresponding elements of the array.

19 Claims, 5 Drawing Sheets

(56) References Cited

U.S. PATENT DOCUMENTS

| | | | |
|---|---|---|---|
| 7,610,036 B2* | 10/2009 | Teo et al. | 455/403 |
| 7,742,533 B2* | 6/2010 | Aoki et al. | 375/260 |
| 7,835,476 B2* | 11/2010 | Aoki et al. | 375/344 |
| 7,860,465 B2* | 12/2010 | Cai | 455/101 |
| 8,130,846 B2* | 3/2012 | Bar-Ness et al. | 375/241 |
| 8,170,081 B2* | 5/2012 | Forenza et al. | 375/141 |
| 8,189,455 B1* | 5/2012 | Ma et al. | 370/208 |
| 8,233,555 B2* | 7/2012 | Naguib et al. | 375/267 |
| 8,509,205 B2 | 8/2013 | Jain et al. | |
| 2002/0021240 A1 | 2/2002 | Elam | |
| 2002/0122511 A1 | 9/2002 | Kwentus et al. | |
| 2002/0150065 A1 | 10/2002 | Ponnekanti | |
| 2003/0036359 A1 | 2/2003 | Dent et al. | |
| 2003/0086479 A1 | 5/2003 | Naguib | |
| 2003/0135374 A1 | 7/2003 | Hardwick | |
| 2003/0185309 A1* | 10/2003 | Pautler et al. | 375/257 |
| 2004/0082303 A1* | 4/2004 | Giannakis et al. | 455/130 |
| 2004/0087294 A1 | 5/2004 | Wang | |
| 2004/0157644 A1 | 8/2004 | Aytur et al. | |
| 2004/0204026 A1 | 10/2004 | Steer et al. | |
| 2005/0001760 A1 | 1/2005 | Mrstik | |
| 2005/0048933 A1* | 3/2005 | Wu et al. | 455/101 |
| 2005/0053169 A1* | 3/2005 | Jia et al. | 375/267 |
| 2005/0078761 A1 | 4/2005 | Hottinen et al. | |
| 2005/0113138 A1* | 5/2005 | Mendolia et al. | 455/558 |
| 2005/0254592 A1* | 11/2005 | Naguib et al. | 375/267 |
| 2006/0072683 A1* | 4/2006 | Kent et al. | 375/267 |
| 2006/0133647 A1 | 6/2006 | Werner et al. | |
| 2006/0182166 A1 | 8/2006 | Abou Rjeily et al. | |
| 2006/0188031 A1 | 8/2006 | Liu | |
| 2006/0210279 A1* | 9/2006 | Hillis et al. | 398/118 |
| 2006/0270360 A1* | 11/2006 | Han et al. | 455/69 |
| 2007/0018884 A1 | 1/2007 | Adams et al. | |
| 2007/0087756 A1* | 4/2007 | Hoffberg | 455/450 |
| 2007/0165104 A1 | 7/2007 | Khan et al. | |
| 2007/0165566 A1* | 7/2007 | Khan et al. | 370/329 |
| 2007/0173288 A1 | 7/2007 | Skarby et al. | |
| 2007/0285312 A1* | 12/2007 | Gao et al. | 342/367 |
| 2008/0049709 A1* | 2/2008 | Pan et al. | 370/344 |
| 2008/0063012 A1* | 3/2008 | Nakao et al. | 370/500 |
| 2008/0080449 A1* | 4/2008 | Huang et al. | 370/342 |
| 2008/0102760 A1* | 5/2008 | McConnell et al. | 455/73 |
| 2008/0151831 A1* | 6/2008 | Khan et al. | 370/330 |
| 2008/0225375 A1 | 9/2008 | Newberg et al. | |
| 2008/0267133 A1* | 10/2008 | Shida et al. | 370/334 |
| 2008/0267318 A1* | 10/2008 | Ihm et al. | 375/299 |
| 2008/0273452 A1* | 11/2008 | Khan et al. | 370/203 |
| 2008/0285667 A1* | 11/2008 | Mondal et al. | 375/260 |
| 2008/0303701 A1* | 12/2008 | Zhang et al. | 341/106 |
| 2013/0094344 A1* | 4/2013 | Zhang et al. | 370/208 |

OTHER PUBLICATIONS

Active towed array sonar, Applied Radar & Sonar Technologies GMBH, retrieved from the Internet at http://www.arstech.de/sonar/active_towed_array_sonar.html, 2008.

David Jenn, Array, antennas in systems and active antennas—Lecture Notes, vol. III, Antennas & Propagation, Naval Postgraduate School—Distance Learning, retrieved from the Internet at http://wvvw.faculty.nps.edu/jenn/EO3602/Vol3v1.3.pdf, 2008.

Bergin, J. et al., "MIMO Phased-Array for SMTI Radar," IEEE Aerospace Conference, 2008, pp. 1-7.

Rabideau, D.J., "Adaptive Mimo Radar Waveforms," IEEE Radar Conference, May 2008, pp. 1-6.

Rabideau, D.J., "Nonadaptive MIMO Radar Techniques for Reducing Clutter," IEEE Radar Conference, May 2008, pp. 1-6.

* cited by examiner

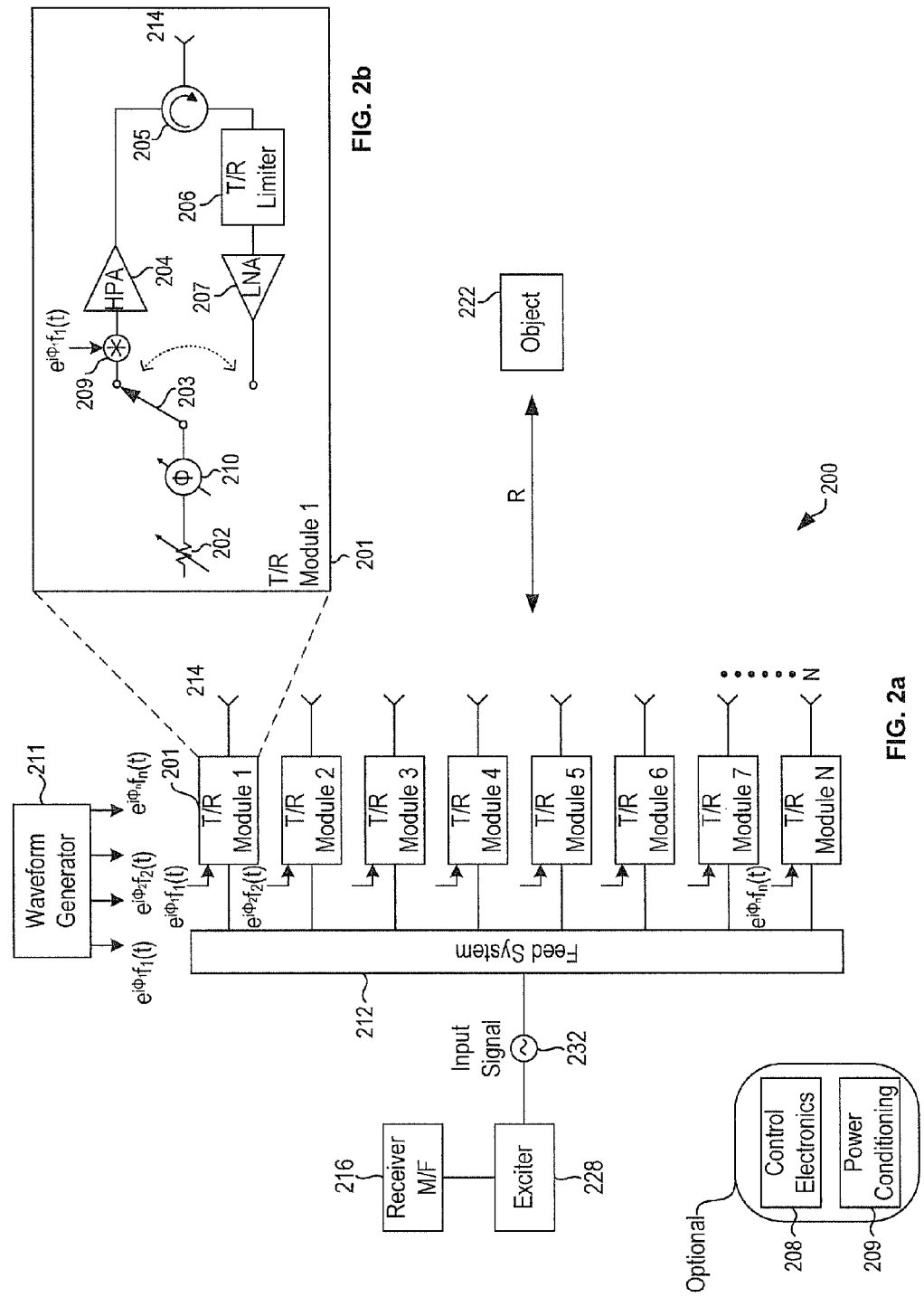

CODED APERTURE SCANNING

RELATED APPLICATIONS

This application is a continuation-in-part of, and claims priority to, U.S. application Ser. No. 12/133,959, entitled "Multicode Aperture Transmitter/Receiver," filed Jun. 5, 2008, the contents of which are hereby incorporated by reference in their entirety

FIELD OF THE DISCLOSURE

The present disclosure is generally related to coded aperture scanning.

BACKGROUND

Phased array antennas are widely used for directing one or more beams of radiation in desired directions for transmission of radiant energy and for reception of radiant energy. A phased array antenna includes multiple radiators, each of which contains a radiating element. A relative phase of radio frequency (RF) waves propagated through each radiating element can be controlled to steer a "beam" of the phased array antenna's radiation pattern. In one type of phased array antenna, known as active arrays (an antenna including multiple low power transmitter elements), each radiating element may have associated electronics, such as amplifiers and phase shifters, to support transmission and reception.

The distributed nature of the active array architecture offers advantages in a wide variety of applications. As one example, a satellite may include an antenna system of this type that facilitates communication between the satellite and one or more ground stations on earth. However, typical active phased array antenna systems use common transmitter modules and waveforms for each of the independent low power transmitter elements and may give rise to overall issues of Radio Frequency Interference (RFI) or damage with respect to other systems and objects, such as Co-channel Interference on cellular communication systems or radiation damage to living objects.

SUMMARY

In a particular embodiment, a method includes splitting a signal into multiple portions corresponding to elements of an array. The method also includes coding and phase adjusting the multiple portions of the signal to form phase adjusted, coded portions of the signal by coding each portion of the multiple portions with a different code and by applying phase adjustments associated with the corresponding elements of the array to the portions. The method also includes transmitting the phase adjusted, coded portions of the signal via the corresponding elements of the array.

In another embodiment, a method includes receiving radiant energy at an antenna, the radiant energy corresponding to coded signal portions. The method also includes multiplying each coded signal portion by a corresponding phase function to select a specific point in space. The method further includes decoding the coded signal portions to form decoded signal portions. The method includes adding the decoded signal portions to form a received signal.

In another embodiment, an array includes multiple antenna elements and a feed system to receive a signal and to split the signal into multiple lower power signals. The array also includes multiple correlators coupled to the feed system and to the multiple antenna elements. The correlators are adapted to decode and phase adjust the lower power signals to form phase adjusted, decoded signals by decoding each of the multiple lower power signals for the different receive directions.

Accordingly, embodiments disclosed herein enable phased array antennas to be implemented without expensive and power consuming electronic phase shifters. For example, phase adjustments for beamforming at a transmit side and/or a receive side can be by applied mathematically at each array element, e.g., by using a correlator at each array element to convolve a signal to be transmitted by the array element with a waveform that includes a phase adjustment for the array element. Further, at the receiver side, multiple directions or points in space can be scanned rapidly and simultaneously.

The features, functions, and advantages that have been described can be achieved independently in various embodiments or may be combined in yet other embodiments, further details of which are disclosed with reference to the following description and drawings.

BRIEF DESCRIPTION OF THE DRAWINGS

FIG. 2a shows a diagram illustrating a transmitter/receiver of an active array for a radar system in accordance with an embodiment.

FIG. 2b shows an exploded view of a transmitter/receiver radiofrequency module 201 of FIG. 2(a) according to an embodiment.

DETAILED DESCRIPTION

Figure 1:
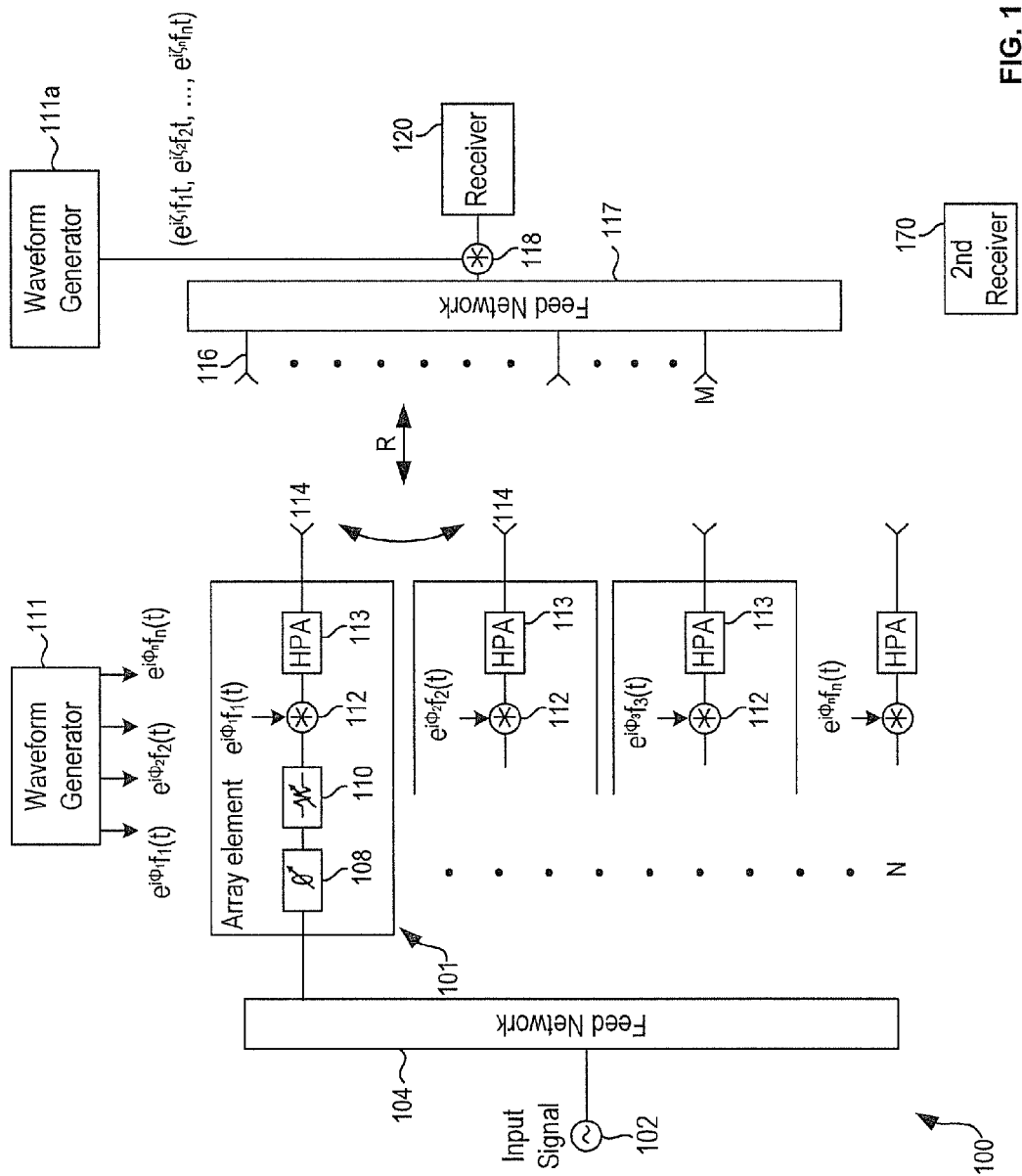
FIG. 1 shows a diagram illustrating a transmitter/receiver for a communications system in accordance with an embodiment.

Systems and methods according to one or more embodiments provide a multicode transmitter/receiver system that reduces detectable power at an unknown receiver or object when a phased array antenna is transmitting. In one or more embodiments, the multicode transmitter/receiver system codes portions of a signal to be transmitted by convolving the portion of the signal with orthogonal output waveforms to generate coded signals to be transmitted by individual elements of a phased array. The coded signals cannot be easily detected by an uncorrelated or unmatched receiver (e.g., a receiver that does not have access to the orthogonal output waveforms or a coding function used to generate the orthogonal output waveforms). For example, each element of the phased array may be low gain with a wide angular beamwidth, and propagation loss associated with each element may be significant for any appreciable distance. Thus the uncorrelated receiver receives radiant energy corresponding to the coded signals as uncorrelated, low energy outputs from each element of the phased array. A matched or correlated receiver, however, may coherently combine the received radiant energy as individual coded signals to recreate or generate the signal that was coded. For example, a radar system may detect returns from its own transmission system because a receiver of the radar is matched to the transmitted coded signals. The matched receiver sees high energy as coming from the high gain transmit array antenna having a narrow angular transmission pattern. Radio Frequency Interference (RFI) of the transmitted coded signal may be reduced based on the number of orthogonal output waveforms used. According to one or more embodiments, the system described herein may assist with power management for several applications including communications systems, radar systems, ultrasound systems, optical systems, infrared systems or other microwave systems.

Further, a direction of a signal transmitted by the phased array antenna may be controlled by including a phase adjustment within each of the orthogonal output waveforms. For example, a function used to generate the orthogonal output waveforms may include both a code function and a phase adjustment function. The phase adjustment applied at each array element may cause an overall beam of the phased array antenna to be transmitted primarily in a particular direction. Additionally or in the alternative, on a receiver side, a receiver side phase adjustment may be applied to selectively receive and process signals from a particular direction (e.g., to beamform a received signal). Combining the phase adjustment with the orthogonal output waveforms used by the multicode transmitter/receiver system may reduce power used for beamforming (e.g., by electronic phase shift elements) and may eliminate or reduce the use of electronic phase shift elements thereby reducing cost and weight. Additionally, combining the phase adjustment with the orthogonal output waveforms used by the multicode transmitter/receiver system may enable simultaneous scanning of multiple locations or directions, because phase adjustments can be applied mathematically to multiple copies of a received signal simultaneously.

Referring to FIG. 1, a diagram is shown illustrating a transmitter and a receiver for a communications system in accordance with an embodiment. In FIG. 1, in an array antenna transmitter system 100 (also referred to as an "active array"), a signal 102 that is to be transmitted is split into multiple lower power signals through a feed network 104. The split signal is then transmitted in the form of multiple coded waveforms that are orthogonal to each other through a number, N, of radiofrequency (RE) modules 101 of the array antenna transmitter system 100. In a particular embodiment, a phase adjustment may be applied to one or more of the multiple coded waveforms to shape or direct a transmission beam of the array antenna transmitter system 100. In a particular embodiment, one of the RF modules 101 may receive a portion of the signal 102 (e.g., one of the lower power signals) via the feed network 104. The feed network 104 may provide portions of the signal 102 to each individual antenna element 114 via a corresponding RF module. Each RF module may include a phase shifter 108, a variable attenuator 110, a correlator 112, a high power amplifier (HPA) 113, or a combination thereof.

A waveform generator 111 may provide individual coding and phase shifting waveforms, $e^{j\Phi_1}f_1(t), e^{j\Phi_2}f_2(t), \ldots, e^{j\Phi_n}f_n(t)$, to the RF modules. The coding and phase shifting waveforms may include a coding waveform, f(t), and a complex coefficient used as a phase shifting waveform, $e^{j\phi}$. In a particular embodiment, the waveform generator 111 may be a component of the corresponding RF module. In yet another embodiment, the coding and phase shifting waveforms of functions to generate the coding and phase shifting waveforms may be stored in memory associated with the corresponding RF module. General techniques for generating random codes for the coding waveforms are set forth in technical literature, such as "Modern Radar" by Raymond S. Berkowitz (John Wiley & Sons, Inc. NY 1965), at chapter 4.

It will be appreciated that different arrangements may be used to split the signal 102 and to feed the split signal to the multiple antenna elements 114 of the array antenna transmitter system 100. Examples may include a parallel feed structure or a corporate feed system, a series feed system, or a space feed system. In the embodiment illustrated in FIG. 1, the feed network 104 is a corporate feed system. Thus, the signal 102 may be split into low power signals or portions, and each portion of the split signal may be individually coded, individually phase adjusted, or both. Each coded and/or phase adjusted portion of the signal 102 may then be directed through a high power amplifier (HPA) 113 to be transmitted through a corresponding individual element 114 of the N-element array antenna transmitter system for a distance "R" such that M receiver elements 116 can detect the returned energy corresponding to the signal 102 and decode and phase adjust this return signal.

The N individual elements 114 may be coordinated in phase to achieve high gain and high power as well as controlled direction from coherent summation of radiation from each individual element 114. Alternately, the N individual elements 114 may be separately phase adjusted to transmit radiant energy primarily in a particular direction or toward a particular location in space. Radiant energy corresponding to the coded and/or phase adjusted portions of the signal 102 may be received at the M receiver elements 116 as the returned signal. The received signal may be coherently integrated and processed. The M receiver elements 116 may be a single element, for M equal to one, or may include multiple M elements in the case of a phased array receiver. The received radiant energy corresponding to each coded portion of signal 102 may be combined through a receiver feed network 117 to form a combined signal (e.g., a received radiofrequency environment). The combined signal may then be decoded at a correlator 118 for each of the coded waveforms by convolution with the sum of the complex conjugate of the coding waveforms used at the transmitter elements. Phase adjustments may be applied to the combined signal from the M receiver elements 116 to process radiation received from a particular direction or location in space. For example, the combined signal may be digitized and copies of the digitized combined signal (e.g., a digitized radiofrequency environment) may be generated. Different phase adjustments may be applied to each copy of the digitized combined signal to focus on radiation received from a particular direction.

The correlator 118 may be integrated into the receiver 120 or it may be separate from the receiver 120. The correlator 118 may be either placed before the receiver 120 or in between the receiver elements 116 and the feed network 117. Decoded signals may then be added (i.e., summed) to generate a complete received signal. The coding waveforms may be supplied by a corresponding waveform generator 111a at the receiver side or the coding waveforms or functions to generate the coding waveforms may be stored in memory at the receiver 120. Consequently, the system illustrated in FIG. 1 may operate as a communications system.

A second receiver 170 may be an unmatched or uncorrelated receiver. The second receiver 170 may detect radiant energy corresponding to the transmitted coded and/or phase adjusted portions of signals from the N individual elements 114. However, the second receiver 170 does not have access to the coding waveforms used to code the signal, thus, the second receiver is not able to match filter or decode the detected radiant energy to recreate the signal 102. Instead, the second receiver 170 detects the radiant energy as uncorrelated, low power signals.

In FIG. 1, for individual elements 114 radiating power "$P_e$", where $G_e$ represents gain of the individual element 114, the power density "$P_D$" at a distance "R" for a proportionality constant $K_c$ that accounts for the transmission medium is:

$$P_D = K_c P_e G_e / 4\pi R^2$$

For "N" elements of the array antenna transmitter system 100, where "$P_e$" is the power per element, the power combines, assuming that the waveforms from the individual elements 114 are not correlated, and thus do not combine coherently, to generate a power density "$P_D$" at a distance "R" as:

$$P_D = K_c N P_e G_e / 4\pi R^2$$

If no coding function, $f_n(t)$, is applied to the portions of the signal 102, or if output portions of the signal 102 radiated from each of the elements 114 have the same coded waveforms, then the transmitted radiation from the elements 114 combines coherently for a transmitted power of ($NP_e$) and an array antenna gain of ($NG_e$), and the power density at distance "R" is:

$$P_D = K_c N^2 P_e G_e / 4\pi R^2$$

If a matched receiver is provided at distance "R", it will be able to decode the waveforms from the "N" individual elements 114 and will be able to combine waveforms coherently. In this case, the power density "$P_D$" of the receiver elements 116 at distance "R" is the same as if all the transmitted coded waveforms were the same or if no coding was applied at elements 114 of the transmitter:

$$P_D = K_c N^2 P_e G_e / 4\pi R^2$$

That is, the power density received from a transmitter with orthogonal coded waveforms for each transmitting element will be "N" times higher for a matched receiver (such as the receiver 120) than for an ordinary receiver (such as the second receiver 170). Consequently, radiofrequency interference (RFI) or radiation hazard is reduced by a factor of N for a multicode transmitter/receiver.

Further, by applying phase adjustments mathematically (e.g., using the correlators 112, 118) electronic phase shifters (such as the phase shifters 108) can be eliminated. Reducing or eliminating use of electronic phase shifters may reduce costs, weight and power consumption of components of a communication system or radar system. Additionally, applying the phase adjustments as disclosed herein enables rapid or even simultaneous scanning of multiple directions or points in space, because the phase adjustments can be applied mathematically to multiple digital copies of a received radiant energy.

Referring to FIG. 2a, a diagram is provided illustrating a transmitter/receiver and an array for a radar system in accordance with an embodiment. Referring also to FIG. 2b, an exploded view of a transmitter/receiver radiofrequency module 201 of FIG. 2a is illustrated according to an embodiment. In FIG. 2a, an active array may act as a transmitter and may also act as a receiver in the case of a radar system 200. A signal 232 from an exciter 228 is split into lower power signals, which are supplied to N transmitter/receiver (T/R) radiofrequency (RF) modules 201 through a feed system 212. As shown in FIG. 2b, each portion of the split signal 232 may be amplitude adjusted at an attenuator 202. Each portion of the split signal 232 may also be phase adjusted at each T/R RF module 201 to produce a desired radiation beam to illuminate a target object 222 at a distance "R". Phase shifting may be accomplished using a phase shifter 210, by adjusting a complex coefficient that is applied to a waveform at a correlator 209, or a combination thereof.

For illustration purposes, a transmitter/receiver (T/R) switch 203 is shown in a transmit mode of operation, as may be the case when the radar system 200 is transmitting. When the radar system 200 is receiving, the T/T switch 203 may be in a receive mode of operation (not shown). Each portion of the signal 232 may be convolved with a coding and phase adjusting waveform, including a coding waveform, f(t), and a phase adjusting waveform in the form of a complex coefficient, $e^{i\phi}$, at a correlator 209 for transmission to a respective antenna element 214. The coding and phase adjusting waveform for the different elements 214 may be orthogonal to each other. The coding and phase adjusting waveforms may be supplied by a waveform generator 211 or may be stored at the respective T/R RF modules 201.

In the transmit mode of the radar system 200, the T/R switch 203 is connected so that the split signal 232 is amplified by transmit drivers and final amplifiers 204, and routed through a circulator 205 to an individual element 214. In a receive mode of the radar system 200, return signals are routed back through the circulator 205, a receiver protector or T/R limiter 206 and a low noise amplifier 207. An amplified return signal may be amplitude adjusted and/or phase shifted by the attenuator 202 and the phase shifter 210, respectively. The return signal may be routed to the feed system 212 and combined after being decoded using matched filters for each of the coded waveforms at a matched filter receiver 216. The decoding may be performed at the receiver 216 by convolution of the combined received signal with a complex conjugate of the sum of the phase shifted coding waveforms, $[e^{i\xi_1}f_1(t)^* + e^{i\xi_2}f_2(t)^{**} + \ldots + e^{i\xi_n}f_n(t)^*]$, which are used to code and phase shift the individual split portions of the signal 232 at the transmitter elements 214. Here, the * sign denotes the complex conjugate, i.e., $f(t)^*$ is the complex conjugate of $f(t)$.

In one or more embodiments, control electronics 208, a power conditioning block 209, or both, may be provided. The control electronics 208 may serve to interface the T/R RF modules 201 to array controllers, providing beam steering and timing information used by the T/R RF modules 201. The power-conditioning block 209 may provide sequential biases and switching commands for the respective T/R RF modules 201 components.

The amplitude weighting (through the attenuator 202) in the transmit and receive modes may be used for synthesizing a low sidelobe pattern of the array, both during transmit and receive modes. For a pulsed radar, during transmit, the receive side low noise amplifier 207 output may be turned off and during receive, the transmit driver and final amplifier 204 input may be turned off by the T/R switch 203. Radar system dead time may be utilized for changing phase and attenuator values (e.g., for beamforming), for switching the T/R switch 203, or both. Other types of radar systems may include a Continuous Wave (CW) radar with independent Transmitter-Receivers, or an FM-CW radar that may receive while transmitting and that is not pulsed but may use the same coding and/or phase shifting technique.

In a particular embodiment, no phase shifter 210 is used and phase adjustment (e.g., for beamforming for transmit and/or receive) is performed by applying the phase shifting function to the coding waveform of each element 214. By applying phase adjustments mathematically, electronic phase shifters (such as the phase shifter 210) can be eliminated. Additionally, applying the phase adjustments enables rapid or even simultaneous scanning of multiple directions or points in space since the phase adjustments can be applied mathematically to multiple digital copies of a received signal environment. Reducing or elimination use of electronic phase shifters may reduce costs, weight and power consumption of components of a radar system.

Figure 2C:
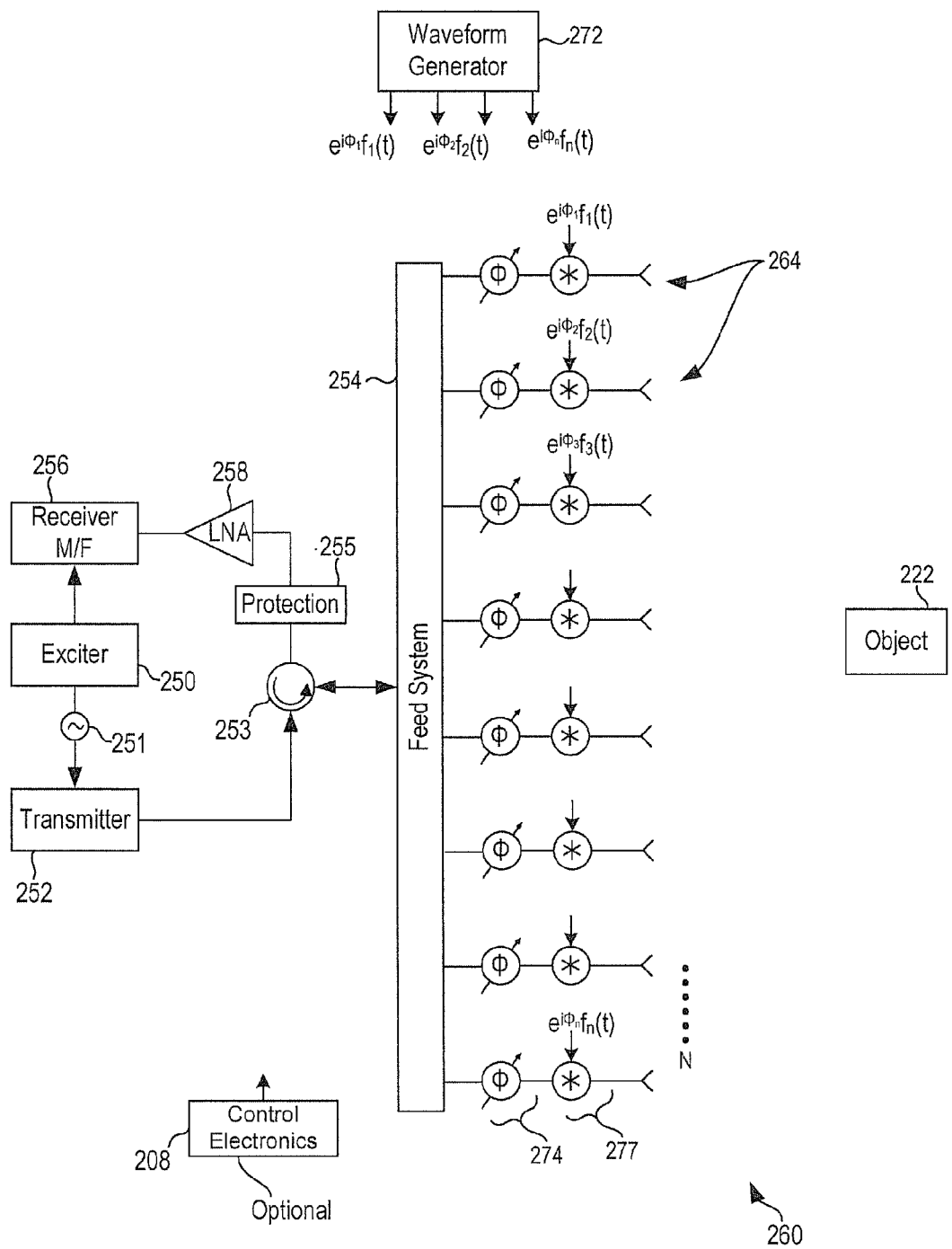
FIG. 2c shows a diagram illustrating a transmitter/receiver of a phased array for a radar system in accordance with an embodiment.

Referring to FIG. 2c, a diagram illustrating a radar system with a passive phased array is shown in accordance with an embodiment. In the embodiment illustrated in FIG. 2c, the passive phased array is used instead of the active array shown in FIGS. 2a and 2b. In FIG. 2c, a transmitter 252 provides amplification of an input signal 251 from an exciter 250 prior to splitting the signal 251 at a feed system 254. Portions of the split signal may be phase shifted through phase shifters 274. Alternately or in addition, the portions of the split signal may be phase shifted by applying a phase shifting function to a coded waveform applied to each of the portions. For example, a coding and phase adjusting waveform, $e^{i\phi}f(t)$, may be convolved with each individual portion of the split signal at correlators 277 prior to transmission through individual transmitting elements 264. The coding and phase shifting waveforms, $e^{i\phi}f(t)$, may be supplied by a waveform generator 272.

A target object 222 is illuminated by radiant energy corresponding to the portions of the split signal (e.g., by multiple signals that are each transmitted at lower power than the signal 251) transmitted through the individual elements 264. The lower power signals are not correlated to each other, due to the coding and phase shifting waveform, and therefore, the target object 222 might not detect that it is being illuminated. Radiant energy reflected by the target object may be received at one or more of the individual elements 264, combined at the feed system 254 and routed via a circulator 253 and protection 255 through a low noise amplifier 258 and decoded by the receiver 256. Resultant decoded signals may be added together to create a strong signal. Thus, in a receive mode of the radar system 260, radiation from each individual transmit element 264 of the array is correlated, and the receiver 256 is able to detect and perform coherent addition of all N coded transmissions for all the waveforms in the return signal. Additionally, during transmission, the radar system 260 is able to sweep multiple directions or points in space by applying different phase adjustments at one or more of the individual elements 264 to direct a transmitted beam in a particular direction. Further, during reception, the radar system 260 is able to sweep multiple directions or points in space (simultaneously, if desired) by applying different phase adjustments at one or more of the individual elements. To sweep multiple directions simultaneously, a received signal environment (i.e., radiant energy detected by the individual elements 264) may be digitized and copied and different phase adjustments may be applied to each copy.

There may be N individual elements 264 of the radar system 260 that are illuminating the target object 222. In conventional radar systems, a beam illuminates an object of interest and energy is scattered back to an antenna. Receive elements of the antenna combine the energy received by the individual elements to achieve an increased gain that is equivalent to the physical size of the collection of elements foaming an antenna array. Consequently, the coherent addition for a phased array achieves a high gain both for transmit and receive as well as addition of transmitted power from individual low power elements, effectively increasing the power density on the target object of interest and the collected power scattered by the target object.

High power radiation and gain are achievable by a matched receiver; however, radiation is detected as low power at a reasonable distance by an uncorrelated receiver (e.g., a receiver of the target object 222). The phased array of the radar system 260 coherently integrates transmit/receive patterns (i.e., is correlated or matched) and, therefore, has an effective transmit/receive gain similar to a high gain transmit/receive antenna.

According to one or more embodiments for a radar system, the target object 222 may be illuminated and waveforms returned as described with respect to FIGS. 2a-2c. For a radar system having matched receivers for each of the receiver individual elements 214 (FIGS. 2a-2b) or 264 (FIG. 2c), the power detected is:

$$P_D = [K_r N^3 P_e G_e G_R \lambda^2 \sigma/(4\pi)^3 R^4]$$

where "$\sigma$" is a radar cross-section of the target object 222 doing the scattering, $K_r$ is a constant depending upon the transmission medium, $G_R$ is antenna element gain when in the receive mode resulting in the effective array receive gain of ($NG_R$), and $\lambda$, is the wavelength of the radiation. The transmit power is ($NP_e$) and the effective array transmit gain is ($NG_e$). $P_D$ in this case is the power detected by a passive phased array radar, where no coding waveform is used. For this radar system, the power density $P_D$ at distance "R" will be the same as described for the communications system in FIG. 1. If a matched receiver is present at distance "R" then the power density will be:

$$P_D = K_c N^2 P_e G_e/4\pi R^2.$$

If the receiver at distance "R" is uncorrelated, or if the radiation is incident on an object at distance "R", then the power density at the uncorrelated receiver or the object will be:

$$P_D = K_c N P_e G_e/4\pi R^2$$

From these equations, it will thus be appreciated that a multicode aperture radar, such as the radar system 200 of FIG. 2a or the radar system 260 of FIG. 2c, provides performance equivalent to an uncoded transmitter while reducing the power density incident at distance "R" by a factor of N.

One or more embodiments utilize gain that is achievable from a phased array antenna to get a factor of N improvement in a radar or communications system performance for N individual elements of the array antenna for power density at a density that would be equivalent to that from independent individual elements of the array.

According to one or more embodiments, a communication system or radar system is provided that is less detectable by an uncorrelated receiver and that has low RFI and has power density sufficient for operation when a matched receiver is provided. In a particular embodiment, no phase shifters 274 are used and phase adjustment (e.g., for beamforming for transmit and receive) is performed by applying a phase shifting function to the coding waveform of each element 264 at each element's correlator 277. By applying phase adjustments mathematically, electronic phase shifters (such as the phase shifter 274) can be eliminated. Additionally, applying the phase adjustments at the correlators 277 enables rapid or even simultaneous scanning of multiple directions or points in space since the phase adjustments can be applied mathematically to multiple digital copies of a received radiofrequency environment or radiant environment. Reducing or eliminating use of the electronic phase shifters may reduce costs, weight and power consumption of components of a radar system.

Although a transmitter/receiver system has been described with respect to a communications system (FIG. 1) as well as radar systems (FIGS. 2a-2c), there are other applications that would benefit from the configuration of the disclosed phased array architectures. For example, in the case of an ultrasound system, the phased array antenna may be replaced by an array of ultrasound transmitters or ultrasound transmitter/receivers, and in the case of an optical or infrared system, the phased array antenna may be replaced by an array of optical or infrared transmitters or optical or infrared transmitter/receivers.

Figure 3:
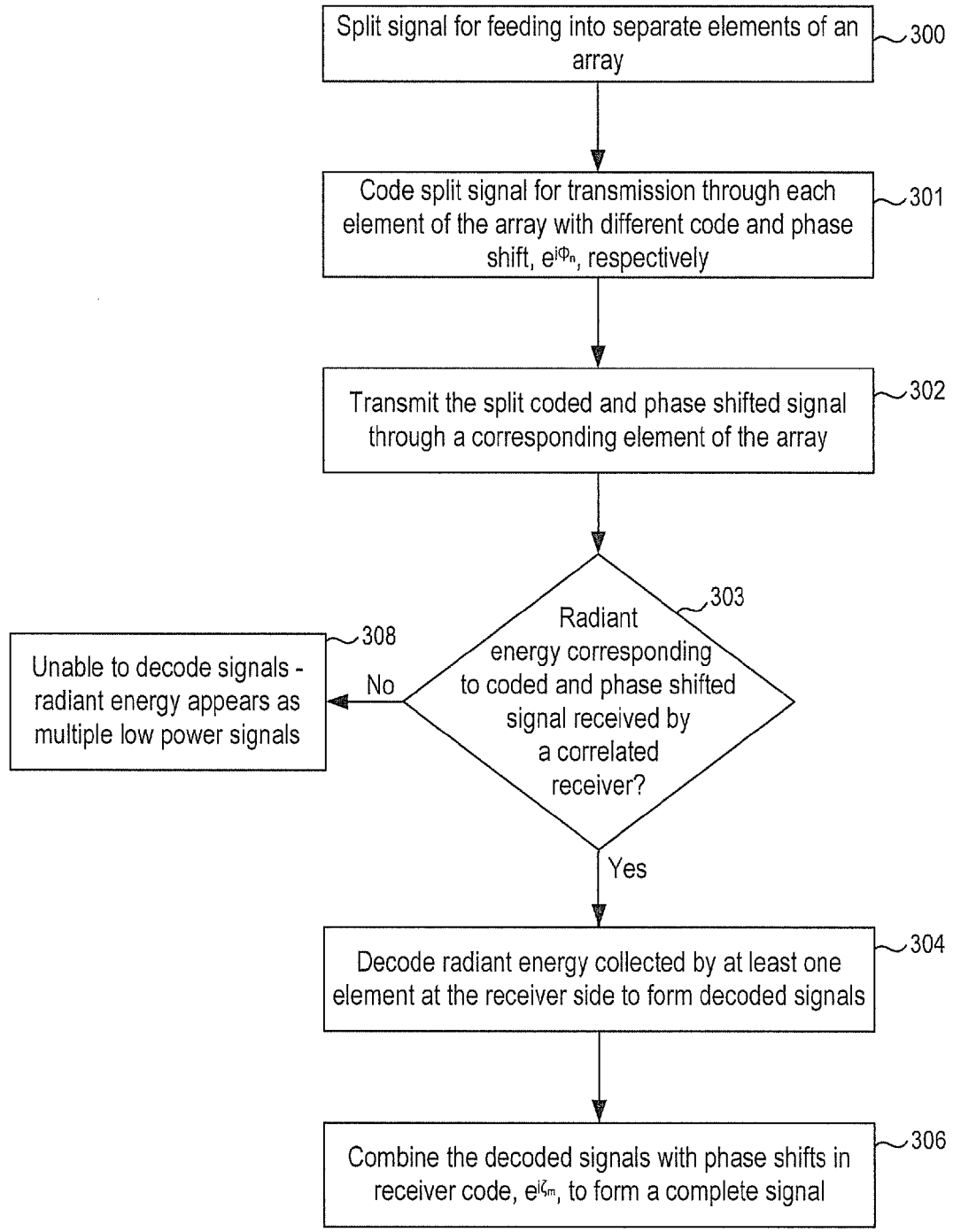
FIG. 3 shows a flow diagram illustrating a method for transmitting/receiving signals according to a first particular embodiment.

Referring to FIG. 3, a flow diagram illustrating a method for transmitting/receiving signals according to a first particular embodiment is illustrated. The method of FIG. 3 may be performed by the communications system shown in FIG. 1 where the active array acts as a transmitter with an external cooperative matched receiver. Additionally or in the alternative, the method of FIG. 3 may be performed by the radar systems shown in FIGS. 2a-2c where the phased array acts as a transmitter and a receiver and illuminates an external target object 222. Further, the method of FIG. 3 may be performed in other applications, such as an ultrasound system where the phased array antenna may be replaced by an array of ultrasound transmitters or ultrasound transmitter/receivers or an optical or infrared system where the phased array antenna may be replaced by an array of optical or infrared transmitters or optical or infrared transmitter/receivers.

The method includes splitting a signal into lower power signals that are fed into separate elements of an array, at 300. As described with respect to FIGS. 1 and 2a-2c, the signal is split and each individual portion (e.g., each lower power signal) of the split signal may be coded with a waveform that is orthogonal to each other waveform used to code each other portion of the split signal.

The portions of the split signal are coded for transmission, each with a different code and a phase shift, respectively, at 301. For example, a coding and phase shifting waveform may be applied to each portion of the split signal. As explained above, the coding and phase shifting waveform, $e^4 f(t)$, may be convolved with each portion of the split signal to form a coded and phase shifted portion of the split signal.

Each individual element of the array separately transmits a corresponding coded and phase shifted portion of the split signal, at 302. The coding from the different individual elements may be orthogonal such that radiant energy from each transmitting element is independent from the perspective of an uncorrelated receiver. Further, the phase shifting may be used to beamform energy that is transmitted to direct the energy primarily in a particular direction or to a particular location in space.

At decision block 303, when radiant energy corresponding to the coded, phase shifted portions of the split signal is received by a matched receiver, the method proceeds to 304. When the radiant energy is not received by a matched receiver, the method proceeds to 308. At 308, the uncorrelated receiver is unable to decode the received signal. For example, the radiant energy may appear as multiple, uncorrelated, low power signals. Thus, in the case of a communication system, radiation from the individual elements (elements 114, for example), does not combine at an external receiver (i.e., the uncorrelated receiver). In the case of a radar system, radiation from the individual elements received at a target object or at an uncorrelated radar receiver does not combine. From the perspective of the uncorrelated receiver, the radiant energy appears to be coming from multiple individual, unrelated antennas; whereas, to a matched receiver the radiant energy appears to be coming from a single large antenna. Consequently, coherent addition in power and increase in gain for an antenna size equivalent to the collection of individual elements 114, 214, 264 do not occur at the uncorrelated receiver (or at the target object).

When the radiant energy is received by a matched receiver, at least one array element at a receiver side may collect and decode radiation corresponding to all the different transmitted coded, phase shifted portions of the split signal, at 304. The collected radiation may be fed to the receiver through a feed system. In a communications system, such as the communication system of FIG. 1, each individual element 116 of an external receiver side may collect all of the portions of the signal 102 and may send them to the receiver 120 where the collected radiation is decoded and added to form a received signal. In a radar system, such as one of the radar system of FIGS. 2a-2c, each individual element of a matched receiver side at the array may detect return radiation. The return radiation may be sent through the feed system to the receiver where the return radiation is decoded and added to form a detected return signal. In an optical or infrared system, the antenna array may be replaced by optical or infrared laser transmitter/receivers, such as laser diode transmitter arrays and receive heterodyne detectors or detector arrays. In an ultrasound system, the antenna array may be replaced by ultrasound transmitter arrays/receivers.

Decoded signals from the array elements may be combined with phase shifts to form a complete signal, at 306. The phase shifts at the receiver side may be used to scan one or more directions or locations in space. For example, a set of receiver side phase shift functions or waveforms, $e^{i x} f(t)$, may be applied to a received signal(s) to beamform the received signal(s) to select a signal received from a particular direction or a particular location in space. In a particular embodiment, the received radiant energy at a particular point in time is digitized and replicated. A different set of receiver side phase shift functions or waveforms can be applied to each digital copy of the received radiant energy at the particular point in time to mathematically "sweep" the antenna array. Thus, signals received from two or more directions or locations concurrently or simultaneously can be separated and examined by applying the receiver side phase shifts. To illustrate, at a particular point in time, radar returns may be received from two different directions. The receiver side phase shift functions or waveforms may be applied to distinguish the radar returns using data captured at the particular point in time. Thus, no mechanical sweep of the antenna is required. Further, constraints associated with manipulating electronic phase shifters for beamforming (such as time and power used to apply phase shifts using electronic phase shifters) may be avoided.

According to one or more embodiments, a coded, phase adjusted transmitter/receiver system may assist in power management for microwave, optical, ultrasonic or other equipment. In many applications, it is desired to radiate power at low levels to avoid interference with other equipment and to reduce radiation hazards to animate objects (people or animals, such as dolphins and whales from Navy sonar testing) or inanimate objects (trigger explosives, damage equipment, etc.). At the same time, radiation of adequate power is necessary so that equipment functions properly. For example, in the case of a radar system, adequate signal to noise ratio for a given range is desired. In the case of a communications system, adequate power is used to communicate data with an acceptable bit error rate.

Figure 4:
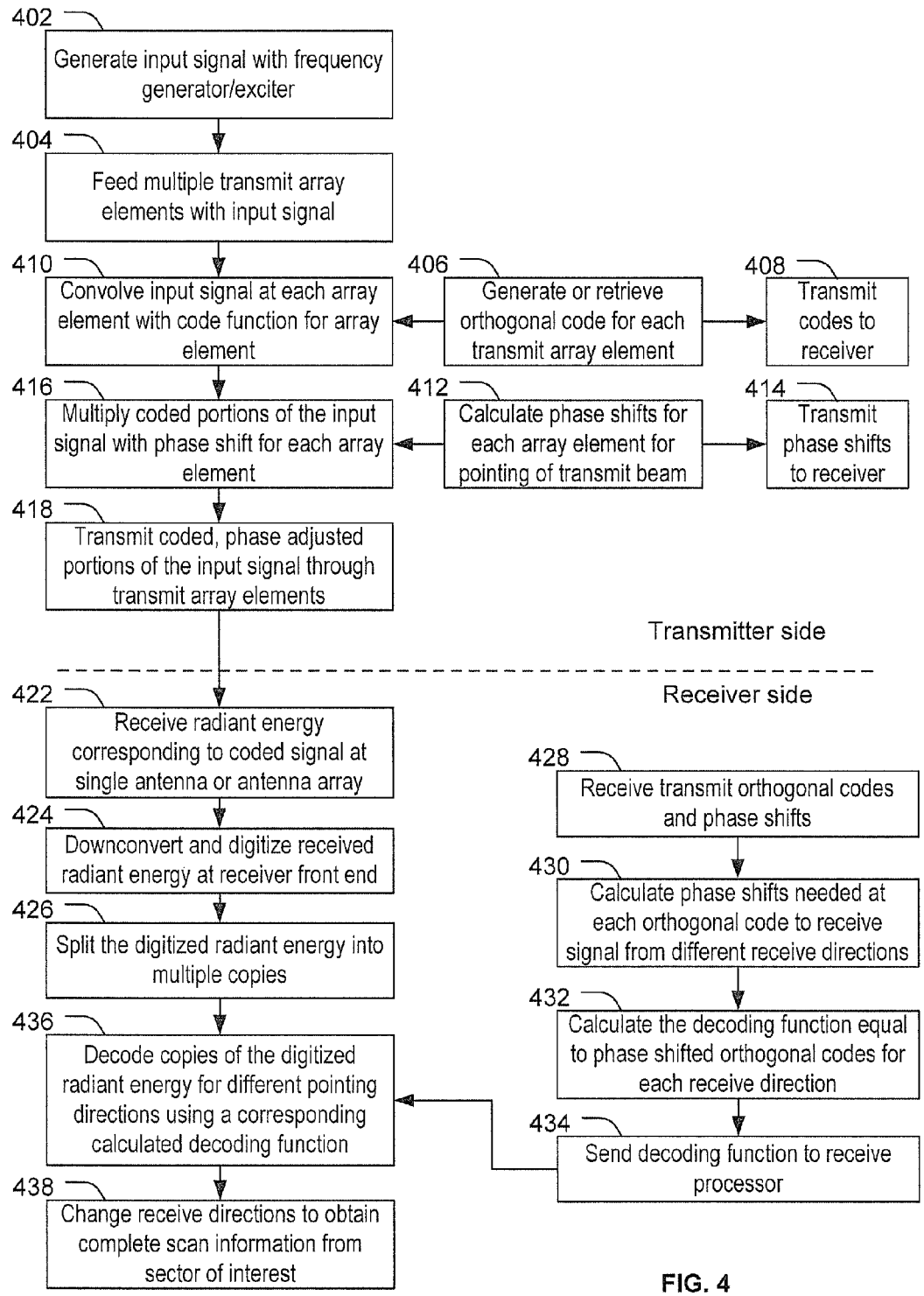
FIG. 4 shows a flow diagram illustrating a method for transmitting/receiving signals according to a second particular embodiment.

Referring to FIG. 4, a flow diagram illustrating a method for transmitting/receiving signals according to a second particular embodiment is illustrated. The method of FIG. 4 may be performed by the communications system shown in FIG. 1 where the active array acts as a transmitter with an external cooperative matched receiver. Additionally or in the alternative, the method of FIG. 4 may be performed by the radar systems shown in FIGS. 2a-2c where the phased array acts as a transmitter and a receiver and illuminates an external target object 222. Furthermore, the method of FIG. 4 may be performed in other applications such as an ultrasound system where the phased array antenna may be replaced by an array of ultrasound transmitters or ultrasound transmitter/receivers or an optical or infrared system where the phased array antenna may be replaced by an array of optical or infrared transmitters or optical or infrared transmitter/receivers.

An input signal may be generated, at 402, for example, by a frequency generator/exciter. The input signal may be fed to multiple transmit array elements, at 404. For example, the input signal may be provided to the multiple transmit array elements via a feed system, such as the feed network 104 of FIG. 1, the feed system 212 of FIG. 2a, or the feed system 254 of FIG. 2c.

A coding waveform for each transmit array element may be generated (e.g., by a waveform generator, such as the waveform generator 111 of FIG. 1, the waveform generator 211 of FIG. 2a, or the waveform generator 272 of FIG. 2c) or received (e.g., from a memory), at 406. The coding waveforms may be orthogonal to one another. The coding waveforms or data descriptive of the coding waveforms may be transmitted to a receiver, at 408. A portion of the input signal may be convolved at each array element with the code function for the array element to generate a coded portion of the input signal, at 410.

A phase shift waveform may be calculated (e.g., by the control electronics 208 of FIG. 2a) for each array element for pointing (e.g., beamforming) of a transmit beam, at 412. The phase shift waveforms or data descriptive of the phase shift waveforms may be transmitted to the receiver, at 414. The coded portions of the input signal may be multiplied with the phase shift waveform for each array element to generate coded, phase adjusted portions of the input signal, at 416. The coded, phase adjusted portions of the input signal may be transmitted, at 418. In a particular embodiment, a coding waveform and a phase shift waveform of a particular array element may be simultaneously applied (rather than sequentially applied) to a portion of the input signal received at the particular array element. For example, a code function and a phase shift function may be combined to generate a coded and phased shift waveform, which may be convolved with the portion of the input signal received at the particular array element (e.g., by a correlator, such as the correlator 112 of FIG. 1, the correlator 209 of FIG. 2a, or the correlators 277 of FIG. 2c).

On a receiver side, radiant energy may be received at a single antenna or at an antenna array, at 422. For example, at least one antenna element at the receiver side may receive radiant energy that correspond to phase adjusted, coded portions of the input signal transmitted by multiple antenna elements of the transmitter side. The received radiant energy may be downconverted and digitized (e.g., at a receiver front end), at 424. The digitized radiant energy may be split (or replicated) into multiple copies, at 426.

The coding waveforms, the phase shift waveforms, or data descriptive thereof (e.g., functions that enable generating the waveforms), transmitted by the transmitter side may be received, at 428. Phase shifts to be applied to each orthogonal code function to receive signals from different receive directions may be calculated (e.g., using a beamforming calculation), at 430. A decoding function equal to phase shifted orthogonal codes for each receive direction may be calculated, at 432. The decoding function may be sent to a receive processor, at 434.

Copies of the digitized radiant energy may be decoded for different pointing directions using a corresponding calculated decoding function, at 436. That is, the receiver side may apply a particular calculated decoding function to decode the received radiant energy such that the complete received signal corresponds to a particular direction. Receive directions may be changed to obtain complete scan information (e.g., a complete received and decoded signal) from a sector of interest, at 438. For example, the receiver side may apply a different calculated decoding function to each of the multiple digital of the radiant energy to generate multiple complete received signals, where each of the multiple complete received signals is associated with a different direction.

Embodiments described above illustrate but do not limit the disclosure. It should also be understood that numerous modifications and variations are possible in accordance with the principles of the present disclosure. Accordingly, the scope of the disclosure is defined by the following claims.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method comprising:
  splitting a signal into multiple portions corresponding to elements of an array;
  coding and phase adjusting the multiple portions of the signal to form phase adjusted, coded portions of the signal by coding each portion of the multiple portions with a different code and by applying phase adjustments associated with the corresponding elements of the array to the portions;
  transmitting the phase adjusted, coded portions of the signal via the corresponding elements of the array;
  receiving radiant energy at an element at a receiver side of the array, wherein the radiant energy corresponds to the phase adjusted, coded portions of the signal;
  decoding the coded portions of the signal to form decoded signal portions;

adding the decoded signal portions to form a received signal;

digitizing the radiant energy to form a digitized radiofrequency environment;

generating multiple copies of the digitized radiofrequency environment; and applying a different phase adjustment function to each copy of the digitized radio frequency environment to generate multiple complete received signals, wherein each of the multiple complete received signals is associated with a different direction.

2. The method of claim 1, further comprising determining a phase adjustment for each element of the array to select a particular direction to scan.

3. The method of claim 1, wherein the receiver side comprises multiple separate receiver elements including at least the element, and wherein more than one of multiple separate receiver elements receives the radiant energy.

4. The method of claim 1, wherein the phase adjusted, coded portions of the signal are directed to a target object and wherein the received radiant energy corresponds to a portion of the phase adjusted, coded portions of the signal that is reflected from the target object.

5. The method of claim 1, wherein the array is an active antenna array.

6. The method of claim 1, wherein the array is a passive antenna array.

7. The method of claim 1, wherein the signal is split by a corporate feed system.

8. The method of claim 1, wherein a first portion of the signal is coded using a first coded waveform that is orthogonal to a second coded waveform that is used to code a second portion of the signal.

9. The method of claim 1, wherein the array is one of an ultrasound transmitter/receiver array, an optical transmitter/receiver array and an infrared transmitter/receiver array.

10. A method comprising:

splitting a signal into multiple lower power signals;

coding and phase adjusting the lower power signals to form phase adjusted, coded portions of the signal by coding each of the lower power signals with a different code and by applying phase adjustments associated with corresponding elements of an antenna array;

transmitting the phase adjusted, coded portions of the signal via the corresponding elements;

receiving radiant energy at an element at a receiver side of the antenna array, wherein the radiant energy corresponds to the phase adjusted, coded portions of the signal;

decoding the coded portions of the signal to form decoded signal portions; and adding the decoded signal portions to form a received signal;

digitizing the radiant energy to form a digitized radiofrequency environment;

generating multiple copies of the digitized radiofrequency environment; and applying a different phase adjustment function to each copy of the digitized radiofrequency environment to generate multiple complete received signals, wherein each of the multiple complete received signals is associated with a different direction.

11. The method of claim 10, wherein the antenna array is one of an ultrasound transmitter/receiver array, an optical transmitter/receiver array and an infrared transmitter/receiver array.

12. The method of claim 10, wherein applying the different phase adjustment function further comprises multiplying at least one copy of the multiple copies of the digitized radiofrequency environment by a phase shifting function corresponding to a particular direction to select the particular direction before forming a received signal associated with a particular direction.

13. The method of claim 10, further comprising splitting the signal using a corporate feed system.

14. The method of claim 10, wherein the antenna array is an active antenna array.

15. The method of claim 10, wherein the antenna array is a passive antenna array.

16. The method of claim 10, wherein a first portion of the signal is coded using a first coded waveform that is orthogonal to a second coded waveform that is used to code a second portion of the signal.

17. An array comprising:

multiple antenna elements;

a feed system to receive a signal and to split the signal into multiple lower power signals;

multiple correlators coupled to the feed system and to the multiple antenna elements, the multiple correlators adapted to code and phase adjust the lower power signals to form phase adjusted, coded portions of the signal by coding each of the multiple lower power signals with a different code and by applying to each of the multiple lower power signals a phase adjustment associated with a corresponding array element of the multiple antenna elements;

at least one element coupled to a receiver to receive radiant energy as received signals corresponding to the phase adjusted, coded portions of a signal transmitted by the multiple antenna elements; and the receiver adapted to decode the received signals and to add decoded received signals to form a complete received signal, wherein the receiver digitizes the received radiant energy to form a digitized radiofrequency environment and generates multiple copies of the digitized radiofrequency environment, and wherein the receiver applies a different phase adjustment function to each copy of the digitized radiofrequency environment to generate multiple complete received signals, wherein each of the multiple complete received signals is associated with a different direction.

18. The array of claim 17, wherein the different codes comprise coded waveforms that are orthogonal to each other.

19. The array of claim 17, wherein the receiver applies a phase adjustment function to decode the received signals such that the complete received signal corresponds to a particular direction.

* * * * *